Patented May 23, 1933

1,910,195

UNITED STATES PATENT OFFICE

HENRY L. H. WATERS, OF MONTREAL, QUEBEC, CANADA

RIPENING OR CURING OF CHEESE

No Drawing. Application filed June 15, 1931, Serial No. 544,714, and in Canada June 27, 1930.

This invention is concerned with the ripening or curing of cheese and the object is to provide a method whereby thoroughly ripened products of the finest quality are obtained in a relatively short length of time under conditions such that shrinkage or loss of weight is reduced to a minimum.

To obtain the best results in curing cheese, it is important to maintain a definite relationship between the original moisture content of the cheese and the temperature and humidiy of the atmosphere in which the cheese is carried during the curing process. By properly co-ordinating these three factors, it is possible to substantially decrease the length of time required to complete the curing process and to also enhance the quality and flavour of the cured product. A cheese having, for example, a moisture content of 35% will ripen more quickly than one having a moisture content of only 32%. A cheese of a given moisture content will also ripen more quickly at 60° F. than it will at 40° F. Similarly, a cheese carried in an atmosphere having a relative humidity of 80% will ripen more quickly than when carried in an atmosphere having a relative humidity of only 70%. Thus, by establishing and maintaining temperature and humidity conditions properly co-ordinated with reference to the original moisture content of the cheese, it is possible to effect a material reduction in the length of time required to complete the curing process and to materially improve the quality and flavour of the cured or ripened product.

A high degree of moisture in the atmosphere in which the cheese is cured is essential to retard evaporation and prevent drying out and shrinkage of the cheese. Hence, in order to reduce evaporation of the moisture content of the cheese to the greatest possible extent, it is desirable that the moisture content of the atmosphere in which the cheese is cured should approach as closely as possible to the saturation point. Also, as the rate at which the chemical and bacteriological changes, known as fermentation, are developed, is largely dependent upon the temperature of the atmosphere in which the cheese is carried, it is important that this temperature be the highest which may be safely used in curing a cheese having a given moisture content without promoting conditions unfavourable to the curing process.

In current practice, it is not considered feasible to carry cheese in an atmosphere having a humidity content exceeding 95%. This is due to the fact that, at higher humidities, it has not been possible to obtain satisfactory results due to the development of moulds and rind rot and to the excessive growth of cheese "mites" or "skippers". After a long period of experiment, I have discovered that this difficulty may be overcome and that certain advantages characteristic of curing cheese in an atmosphere having a moisture content exceeding 95% may be obtained by turning the cheese at regular periods during the curing process and by wiping the rinds of the cheese at each turn with a solution effective to retard the development of cheese "mites" and to ensure that the rind will carry in sound condition without the development of soft tops or rind rot. While it is possible that various brine solutions and gases may be subsequently developed for this purpose, I have found that the best results are obtained by wiping the rinds of the cheese with a saturated solution of disodium phosphate.

In carrying out this invention, the cheese, after being unboxed, is placed on shelves in a suitable room or chamber in which the temperature and humidity of the atmosphere is properly co-ordinated with reference to the original moisture content of the cheese to be cured. At regular intervals the cheese is turned end for end and the rind wiped off at each turning with a saturated solution of disodium phosphate. It is preferred that the cheese be turned over every two or three days, but it is quite possible that some variation from this procedure may be resorted to with satisfactory results. This periodical turning of the cheese, accompanied by treatment of the rind with disodium phosphate enables the humidity of the atmosphere in the curing chamber to be increased beyond 95% without the excessive development of moulds, rind rot and the excessive growth of "mites" such as usually characterizes the curing of cheese in an atmosphere having a humidity exceeding 95%. Under these conditions, it is possible in curing cheese having an original moisture content ranging from 32% to 35% or thereabouts to maintain the atmosphere in the curing chamber at a relatively high temperature ranging between the limits of 55° F. to 65° F. For curing cheese having a moisture content within the limits specified, this range of temperatures with a relative humidity of 96% to 97% creates a condition such that the desired chemical and bacteriological changes take place under optimum favourable conditions with the result that the cheese ripens more quickly and is found to have a quality and flavour superior to that obtained with any of the ripening or curing processes now in use.

In the foregoing I have described what I now consider to be the best method of applying the principles of my invention, but it will be understood that certain modifications may be resorted to within the scope and spirit of the appended claims.

Having thus described my invention, what I claim is:

1. A method of ripening cheese which consists in exposing cheese having an original moisture content ranging from 32% to 35% to an atmosphere having a temperature ranging between the limits of 55° F. to 65° F. and a humidity content ranging between the limits of 96% to 97%, turning the cheese at regular intervals and treating the rinds of the cheese, at each turning, with a solution of disodium phosphate effective to retard the development of moulds and rind rot and the excessive growth of cheese "mites".

2. A method of ripening cheese which consists in exposing cheese having an original moisture content ranging from 32% to 35% to an atmosphere having a temperature ranging between the limits of 55° F. to 65° F. and a humidity content ranging between the limits of 96% to 97%, turning the cheese at regular intervals and treating the rinds of the cheese at each turning with a saturated solution of disodium phosphate.

In witness whereof, I have hereunto set my hand.

HENRY L. H. WATERS.